(12) United States Patent
Letondor et al.

(10) Patent No.: US 11,117,162 B2
(45) Date of Patent: Sep. 14, 2021

(54) EPILAMIZATION AGENT COMPRISING A CLEAVABLE LINKING GROUP AND EPILAMIZATION METHOD USING SUCH AN EPILAMIZATION AGENT

(71) Applicant: The Swatch Group Research and Development Ltd, Marin (CH)

(72) Inventors: Christophe Letondor, Le Landeron (CH); Claire Rannoux, Morges (CH); Nicholas David Spencer, Zollikon (CH)

(73) Assignee: The Swatch Group Research and Development Ltd, Marin (CH)

(*) Notice: Subject to any disclaimer, the term of this patent is extended or adjusted under 35 U.S.C. 154(b) by 489 days.

(21) Appl. No.: 15/970,013

(22) Filed: May 3, 2018

(65) Prior Publication Data
US 2018/0318872 A1   Nov. 8, 2018

(30) Foreign Application Priority Data
May 5, 2017 (EP) .................................. 17169633

(51) Int. Cl.
| | |
|---|---|
| *B32B 9/00* | (2006.01) |
| *B05D 1/18* | (2006.01) |
| *B05D 7/14* | (2006.01) |
| *C10M 107/40* | (2006.01) |
| *C10M 107/50* | (2006.01) |
| *C10M 107/38* | (2006.01) |
| *C09D 133/16* | (2006.01) |
| *C09D 153/00* | (2006.01) |
| *C08F 293/00* | (2006.01) |
| *C10M 107/34* | (2006.01) |
| *C10M 107/28* | (2006.01) |
| *C10M 107/46* | (2006.01) |
| *C08F 220/24* | (2006.01) |
| *B05D 7/00* | (2006.01) |
| *C10N 30/06* | (2006.01) |
| *C10N 30/00* | (2006.01) |
| *C10N 40/06* | (2006.01) |
| *C10N 50/02* | (2006.01) |
| *C10N 80/00* | (2006.01) |

(52) U.S. Cl.
CPC .............. *B05D 1/185* (2013.01); *B05D 7/14* (2013.01); *C08F 220/24* (2013.01); *C08F 293/005* (2013.01); *C09D 133/16* (2013.01); *C09D 153/00* (2013.01); *C10M 107/28* (2013.01); *C10M 107/34* (2013.01); *C10M 107/38* (2013.01); *C10M 107/40* (2013.01); *C10M 107/46* (2013.01); *C10M 107/50* (2013.01); *B05D 2502/00* (2013.01); *B05D 2505/00* (2013.01); *B05D 2507/00* (2013.01); *B05D 2518/00* (2013.01); *C08F 2438/01* (2013.01); *C08F 2438/02* (2013.01); *C08F 2438/03* (2013.01); *C10M 2209/084* (2013.01); *C10M 2213/04* (2013.01); *C10M 2229/046* (2013.01); *C10N 2030/06* (2013.01); *C10N 2030/26* (2020.05); *C10N 2040/06* (2013.01); *C10N 2050/02* (2013.01); *C10N 2080/00* (2013.01)

(58) Field of Classification Search
CPC ......... C10M 107/38; C10M 2213/0606; Y10T 428/3154; C09D 133/16
See application file for complete search history.

(56) References Cited

U.S. PATENT DOCUMENTS

| | | | |
|---|---|---|---|
| 9,534,134 B2* | 1/2017 | Richard | C10M 107/48 |
| 10,590,301 B2* | 3/2020 | Letondor | C09D 127/12 |
| 2010/0068553 A1* | 3/2010 | Tosatti | C10M 105/54 428/624 |
| 2010/0098926 A1* | 4/2010 | Tosatti | C10M 105/54 428/220 |
| 2012/0088099 A1 | 4/2012 | Tosatti et al. | |
| 2015/0197661 A1* | 7/2015 | Richard | G04B 99/00 428/421 |
| 2016/0272749 A1 | 9/2016 | Letondor et al. | |
| 2016/0272842 A1* | 9/2016 | Letondor | C09D 133/14 |

FOREIGN PATENT DOCUMENTS

| | | |
|---|---|---|
| CN | 1715270 A | 1/2006 |
| CN | 105985697 A | 10/2016 |
| EP | 3 070 133 A1 | 9/2016 |
| EP | 3 070 152 A1 | 9/2016 |

OTHER PUBLICATIONS

Xu et al., Perfluorocyclobutyl Aryl EtherBased ABC Amphiphilic Triblock Copolymer, Scientific Reports | 6:39504 | DOI: 10.1038/srep39504 (Year: 2016).*

European Search Report dated Aug. 17, 2017 in European Application 17169633.9 filed on May 5, 2017 (with English Translation of Categories of Cited Documents and Written Opinion).

(Continued)

*Primary Examiner* — Hoa (Holly) Le

(74) *Attorney, Agent, or Firm* — Oblon, McClelland, Maier & Neustadt, L.L.P.

(57) ABSTRACT

An epilamization agent containing at least one compound including at least hydrophobic and oleophobic moieties arranged to impart epilame properties to the compound, and at least one hydrophilic moiety arranged to make the compound soluble in aqueous medium, the hydrophilic moiety being linked to the compound by at least one cleavable group. A method for coating a substrate with epilame, including: preparing an aqueous epilamization bath by solubilising such an epilamization agent, placing the substrate in contact with the epilamization agent in the epilamization bath, separating the hydrophilic moiety from the epilamization agent by cleavage, rinsing the substrate to eliminate the hydrophilic residues from the hydrophilic moiety and drying.

16 Claims, No Drawings

(56) References Cited

OTHER PUBLICATIONS

Elizabeth G. Kelley, et al., "Stimuli-responsive copolymer solution and surface assemblies for biomedical applications," The Royal Society of Chemistry: Chem. Soc. Rev., 2013, vol. 42, No. 17, pp. 7057-7071.

Combined Chinese Office Action and Search Report dated Dec. 14, 2020, in Chinese Patent Application No. 201810418489.2 (with English translation), 23 pages.

* cited by examiner

EPILAMIZATION AGENT COMPRISING A CLEAVABLE LINKING GROUP AND EPILAMIZATION METHOD USING SUCH AN EPILAMIZATION AGENT

This application claims priority from European patent application No. 17169633.9 filed on May 5, 2017, the entire disclosure of which is hereby incorporated herein by reference.

FIELD OF THE INVENTION

The present invention relates to the field of mechanics and in particular to the field of horology or jewellery. It more particularly concerns an epilamization agent, a copolymer, and a substrate, particularly a substrate for an element of a timepiece or piece of jewellery comprising a surface at least partially coated with an epilame derived from such an epilamization agent or from such a copolymer. It also concerns a method for coating such a substrate with epilame, and a timepiece or piece of jewellery comprising an element comprising such a substrate.

BACKGROUND OF THE INVENTION

There are various methods for modifying the surface state of a substrate through a treatment using an appropriate agent to specifically improve certain surface properties. For example, in the field of mechanics, and in particular in the field of horology, but also in the field of jewellery, epilamization of a surface of a piece or of an element is often achieved by means of an epilamization agent to control and reduce the surface energy of said surface during use. More specifically, the purpose of an epilame is to prevent the spreading of oils or lubricants on the elements of a timepiece or piece of jewellery by forming a hydrophobic and lipophobic (or oleophobic) surface allowing the lubricant to remain in a predetermined place on the treated surface.

The standard epilamization method is a dip coating process. It consists of dipping the timepiece in an epilamization bath, i.e. a solution of the epilamization agent in a solvent. The permanent and effective epilamization agents currently used for epilamization are at least partially fluorinated. Consequently, the molecules that make up such agents are insoluble or poorly soluble in solvents other than fluorinated solvents. Thus, epilamization baths must be based on a fluorinated solvent and are therefore not ecological. They may also require the use of closed equipment with vapour recovery and reprocessing, which generates significant costs.

To overcome this problem, a proposed solution has been to develop epilamization agents comprising more weakly fluorinated molecules and which can be solubilised in an organic solvent, such as isopropyl alcohol. However, the deposited epilame exhibits resistant to washing and an epilame effect that does not meet the requirements of horology. Moreover, the organic solvents used also have disadvantages, such as inflammability and toxicity.

SUMMARY OF THE INVENTION

It is an object of the invention to overcome the various drawbacks of known epilamization agents and known epilamization processes.

More specifically, it is an object of the invention to provide an epilamization agent making possible an ecological epilamization method, using an aqueous epilamization bath.

To this end, the present invention concerns an epilamization agent containing at least one compound containing at least hydrophobic and oleophobic moieties arranged to impart epilame properties to said compound, and at least one hydrophilic moiety arranged to make said compound soluble in aqueous medium, said hydrophilic moiety being linked to the compound by at least one cleavable group.

The present invention also comprises a copolymer comprising M units, N units and optionally at least one P unit, linked by covalent bonds by their main chains, where M is

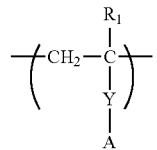

N is

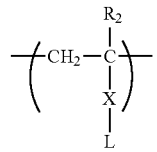

P is

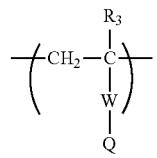

where $R_1$, $R_2$, $R_3$, which may be identical or different, are H, a $C_1$-$C_{10}$ alkyl group, $C_1$-$C_{10}$ alkenyl group, and preferably H, $CH_3$, W, X, which may be identical or different, are spacer arms formed of a heteroatom or of a linear or branched hydrocarbon chain comprising at least one carbon atom, and that may contain at least one heteroatom;

Y, which may be identical or different, is a moiety comprising at least one cleavable group;

A, which may be identical or different, is a hydrophilic moiety arranged to make said copolymer soluble in aqueous medium;

L, which may be identical or different, is a halogenated, preferably fluorinated, $C_1$-$C_{20}$ carbon moiety;

Q, which may be identical or different, is H, $CH_3$, a linear or branched, saturated or unsaturated hydrocarbon chain which is preferably different from A, comprising at least one carbon atom, and which may contain at least one heteroatom.

The present invention also concerns a block copolymer comprising at least one block of N units and optionally at least one P unit, linked by covalent bonds by their main chains, and at least one block comprising at least one hydrophilic moiety arranged to make said copolymer soluble in aqueous medium, said blocks being linked to each other by covalent bonds by at least one cleavable group Y, wherein N, P and Y are as defined above.

In a particularly preferred manner, the epilamization agent according to the invention contains at least one compound formed by one of the copolymers defined above.

Such an epilamization agent makes it possible to use an aqueous epilamization bath to obtain an economical and ecological epilamization method, while providing an efficient and permanent epilame effect.

The present invention also concerns an epilamization bath containing at least 50% by volume of water and an epilamization agent as defined above.

The present invention also concerns the use of a compound containing at least hydrophobic and oleophobic moieties arranged to impart epilame properties to said compound, and at least one hydrophilic moiety arranged to make said compound soluble in aqueous medium, said hydrophilic moiety being linked to the compound by at least one cleavable group, as epilamization agent.

The present invention also concerns the use of a copolymer as defined above as epilamization agent.

The invention also concerns a method for coating with epilame at least one part of a substrate surface comprising the steps of:
a) preparing an epilamization bath by solubilising at least one epilamization agent as defined above or containing at least one copolymer as defined above in a solution containing at least 50% by volume of water
b) optionally, preparing the substrate surface
c) placing the substrate surface in contact with the epilamization agent in the epilamization bath
d) optionally, drying
e) separating the hydrophilic moiety from the epilamization agent by cleavage
f) rinsing the substrate surface
g) drying.

The present invention also concerns a substrate having a surface at least part of which is coated with an epilame, wherein said epilame was obtained by cleaving an epilamization agent as defined above or containing at least one copolymer as defined above, said epilame containing at least one compound containing at least hydrophobic and oleophobic moieties and at least one remainder of a cleavable group which was used to link at least one hydrophilic moiety to said compound.

The present invention also concerns a timepiece or piece of jewellery with an element comprising a substrate as defined above.

DETAILED DESCRIPTION OF THE INVENTION

According to the present invention, there is described an epilamization agent containing at least one compound containing at least hydrophobic and oleophobic moieties arranged to impart epilame properties to said compound, and at least one hydrophilic moiety arranged to make said compound soluble in aqueous medium, said hydrophilic moiety being linked by covalent bonding to the compound by at least one cleavable group.

Advantageously, the hydrophobic and oleophobic moieties, which may be identical or different, contain a halogenated, preferably fluorinated, $C_1$-$C_{20}$ carbon moiety.

The hydrophilic moieties used in the invention are capable of forming (hydrogen, ionic) bonds with water molecules. They are selected to be highly polar and hydrophilic in order to solubilise in an aqueous solution, preferably water, the compound and its epilame-effect hydrophobic and oleophobic moieties. The number and/or size of the hydrophilic moieties are selected to be capable of temporarily masking the hydrophobic effect of said epilame-effect hydrophobic and oleophobic moieties. Thus, the epilamization agent according to the invention can be used in the form of a perfectly ecological, aqueous epilamization bath, making possible the deposition of an epilamization agent by means of an ecological epilamization method.

Preferably, the hydrophilic moiety is selected from the group comprising a moiety derived from a glycol ether, a moiety derived from an amine, from an alcohol, from a carboxylic acid, from a sulfonic acid, from a phosphonic acid, from a carboxylate salt, from a sulfonate salt, from a phosphonate salt.

In a particularly preferred manner, the hydrophilic moiety used in the invention is a moiety derived from a glycol ether taking the form of a moiety derived from a polyether, preferably a polyethylene glycol or polypropylene glycol, or a moiety derived from an amine taking the form of a moiety derived from a polyamine.

Once the epilamization agent has been deposited on the substrate surface, the hydrophilic group used for solubilisation in aqueous medium must then be eliminated from the compound and removed from the substrate surface so that the compound remaining on the surface has the desired epilame effect, owing to its epilame-effect hydrophobic and oleophobic moieties.

To this end, the hydrophilic moiety is linked to the compound by a cleavable chemical bond, by means of a cleavable group linking said hydrophilic group to the compound by covalent bonding.

Preferably, the cleavable group is a group that can be cleaved by at least one of the treatments selected from the group comprising a UV treatment, a thermal treatment, a mechanical stimuli treatment, an enzyme treatment, and a chemical trigger treatment. The various treatments for separating the hydrophilic moiety from the epilamization agent can be applied individually, or simultaneously or in series, depending upon the nature of the cleavable group that has to be separated from the remainder of the compound containing the hydrophobic and oleophobic moieties, with the hydrophilic moiety. Preferably the cleavable group is chosen from the group comprising a UV-cleavable group, a thermally cleavable group, a group cleavable by mechanical stimuli, an enzyme cleavable group, and a group cleavable by a chemical trigger.

In a particularly preferred manner, the cleavable group is chosen from the group comprising
a UV-cleavable moiety derived from a nitrobenzyl ester, such that

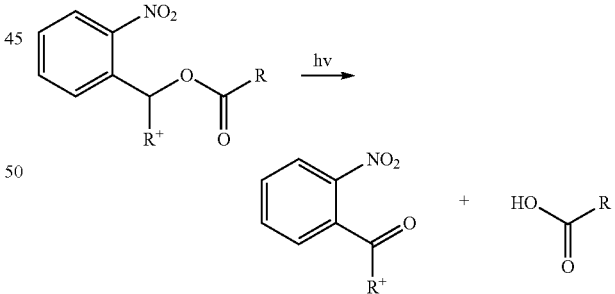

Heating T > 90° C.

a thermally 25 cleavable Diels-Alder adduct, such that

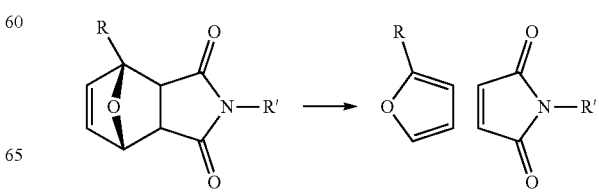

a group cleavable by mechanical stimuli (for example, ultrasound), such that

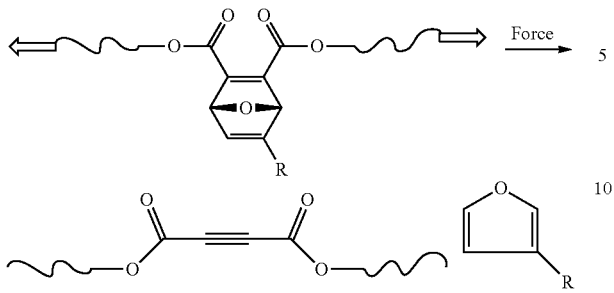

an enzyme cleavable group, for example an esterase enzyme and a moiety comprising a dithio function cleavable by a chemical trigger, such that

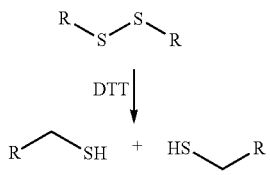

where R is the compound with its epilame-effect hydrophobic and oleophobic moieties and R' is the hydrophilic moiety.

In a particularly preferred manner, the cleavable group is a group derived from a nitrobenzyl ester.

According to the embodiments of the invention, the cleavable group with the associated hydrophilic moiety can form a linear or branched structure with the compound, and the hydrophobic and oleophobic moieties can also form a linear or branched structure with the compound, the different combinations being possible. Thus, for example, the hydrophobic and oleophobic moieties and the hydrophilic moieties linked to the compound by a cleavable group respectively form side chains on the carbon skeleton of the compound, distributed statistically or in blocks, or the hydrophobic and oleophobic moieties form side chains on the carbon skeleton of the compound and the hydrophilic moieties form a linear structure and are linked by a cleavable group to the compound, or the hydrophobic and oleophobic moieties form side chains on the carbon skeleton of the compound, and the hydrophilic moieties form side chains on a carbon skeleton linked to the compound by a cleavable group.

The present invention also comprises a copolymer comprising M units, N units and optionally at least one P unit, linked by covalent bonds by their main chains, where M is

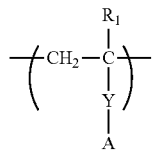

N is

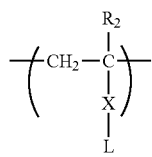

P is

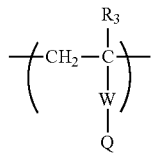

where $R_1$, $R_2$, $R_3$, which may be identical or different, are H, a $C_1$-$C_{10}$ alkyl group, $C_1$-$C_{10}$ alkenyl group, and preferably H, $CH_3$, W, X, which may be identical or different, are spacer arms formed of a heteroatom or of a linear or branched hydrocarbon chain comprising at least one carbon atom, and that may contain at least one heteroatom;

Y, which may be identical or different, is a moiety comprising at least one cleavable group;

A, which may be identical or different, is a hydrophilic moiety arranged to make said copolymer soluble in aqueous medium;

L, which may be identical or different, is a halogenated, preferably fluorinated, $C_1$-$C_{20}$ carbon moiety;

Q, which may be identical or different, is H, $CH_3$, a linear or branched, saturated or unsaturated hydrocarbon chain, which is preferably different from A, comprising at least one carbon atom, and which may contain at least one heteroatom.

Such a copolymer can be used to form the epilamization agent compound as defined above.

Preferably, the copolymer is formed only of M and N units and optionally P units. Preferably, the copolymer is formed only of M, N and P units.

The copolymer of the invention may be a statistical copolymer in which the M, N and P units are statistically linked by their main chains, i.e. distributed randomly, such that the statistical copolymer can be written in the form (I):

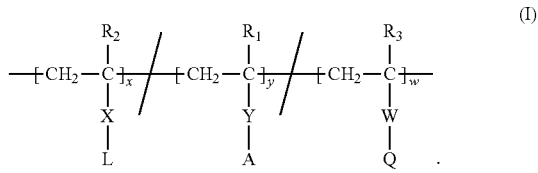

(I)

The copolymer of the invention may also be a block copolymer comprising at least one block of M units linked by covalent bonds by their main chains, and at least one block of N units optionally comprising at least one P unit linked by covalent bonds by their main chains, said blocks being linked to each other by covalent bonds by their main chains in linear sequences.

The block copolymer can be written in the form (II):

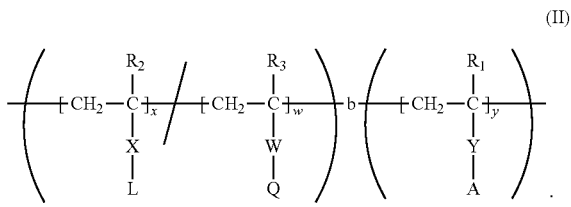

(II)

Preferably, the block copolymer comprises a single block of M units and a single block of N units optionally comprising at least one P unit. Preferably, the M units are distributed by statistical copolymerization to form a single block comprising M units.

The P units can be distributed within the block formed of N units, for example by statistical copolymerization of P units with the N units, the assembly forming a single block preferably formed mostly of N units and assimilated to a block of N units.

The P units may also be in the form of a third block, the block of P units being preferably connected to the block of N units, in turn connected to the block of M units, by covalent bonds by their main chains in linear sequences. The block copolymer can be written in the form:

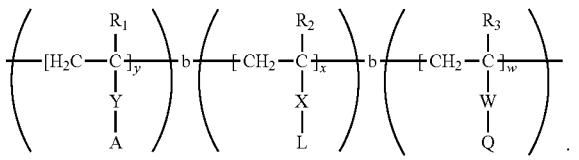

Preferably, the A moiety is a hydrophilic moiety chosen from the group comprising a moiety derived from a glycol ether, preferably taking the form of a moiety derived from a polyether, preferably a moiety derived from a polyethylene glycol (PEG) or a polypropylene glycol (PPG), a moiety derived from an amine, preferably taking the form of a moiety derived from a polyamine, a moiety derived from an alcohol, from a carboxylic acid, from a sulfonic acid, from a phosphonic acid, from a carboxylate salt, from a sulfonate salt and from a phosphonate salt. The moiety derived from a polyether or from a polyamine preferably contains between 2 and 100 units, more preferentially between 5 and 30 units. In a more particularly preferred manner, A is a moiety derived from a polyethylene glycol (PEG) or from a polypropylene glycol (PPG), preferably comprising between 2 and 100 units, more preferentially between 5 and 30 units.

The present invention also concerns a block copolymer comprising at least one block of N units optionally comprising at least one P unit, linked by covalent bonds by their main chains, and at least one block comprising at least one hydrophilic moiety arranged to make said copolymer soluble in aqueous medium, said blocks being linked to each other by covalent bonds by at least one cleavable group Y, where N, P and Y are as defined above.

Such a copolymer can be used to form the epilamization agent compound as defined above.

According to one embodiment, the block comprising at least one hydrophilic moiety is an A' moiety chosen from the group comprising at least one moiety derived from a glycol ether, preferably taking the form of a moiety derived from a polyether, preferably a moiety derived from a polyethylene glycol (PEG) or a polypropylene glycol (PPG), and a moiety derived from an amine, preferably taking the form of a moiety derived from a polyamine. The block copolymer can be written in the form (III):

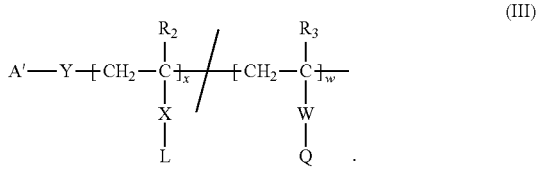

Preferably, the hydrophilic moiety A' comprises between 1 and 200 units, more preferentially between 5 and 100 units, and even more preferentially between 10 and 50 units. In a particularly preferred manner, A' is a moiety derived from a glycol ether preferably comprising between 1 and 200 units of ethylene or propylene glycol. Preferentially, A' is a moiety derived from a polyethylene glycol (PEG) or from a polypropylene glycol (PPG), preferably comprising between 2 and 200 units of ethylene or propylene glycol, more preferentially between 5 and 100 units, and even more preferentially between 10 and 50 units.

According to another variant embodiment, the block comprising at least one hydrophilic moiety comprises G units linked by covalent bonds by their main chains, where G is

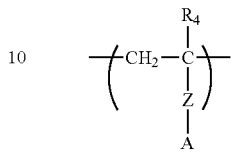

where $R_4$, which may be identical or different, is a $C_1$-$C_{10}$ alkyl, $C_1$-$C_{10}$ alkenyl group, and preferably H, $CH_3$, Z, which may be identical or different, is a spacer arm formed of a heteroatom or of a linear or branched hydrocarbon chain comprising at least one carbon atom, and that may contain at least one heteroatom;

A is as defined above.

This block copolymer can be written in the form (IV):

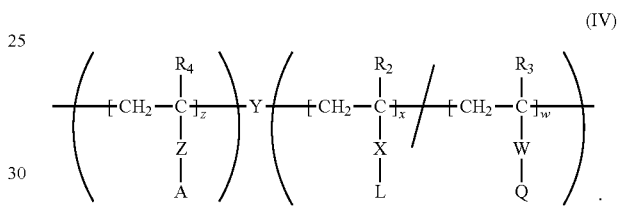

The A moiety is as defined above, such that, for example, the block comprising at least one hydrophilic moiety comprising G units is a moiety derived from a polyether-functionalized poly(meth)acrylate, preferably PEG- or PPG-functionalized poly(meth)acrylate, from polyamine-functionalized poly(meth)acrylate, from amine-functionalized poly(meth)acrylate, from alcohol-functionalized poly(meth)acrylate, from carboxylic acid-functionalized poly(meth)acrylate, from sulfonic acid-functionalized poly(meth)acrylate, from phosphonic acid-functionalized poly(meth)acrylate, from carboxylate-functionalized poly(meth)acrylate, from sulfonate-functionalized poly(meth)acrylate, from phosphonate-functionalized poly(meth)acrylate, from PEG- or PPG-functionalized polystyrene, from phosphonate-functionalized polystyrene, from sulfonate-functionalized polystyrene, from phosphonic acid-functionalized polystyrene, or from sulfonic acid functionalized polystyrene. The expression "(meth)acrylate" means acrylate or methacrylate.

Preferably, the block comprising at least one hydrophilic moiety comprising G units is a moiety derived from a PEG- or PPG-functionalized poly(meth)acrylate or from a PEG- or PPG-functionalized polystyrene.

The number of units z is at least two, preferably comprised between 5 and 200 units and more preferentially between 10 and 100.

The A' block and the block comprising the G units may be used with the block of N units optionally comprising at least one P unit to form a triblock copolymer.

For all the copolymers defined above, the identical or different W, X, Z moieties are advantageously chosen from the group comprising $C_1$-$C_{20}$, preferably $C_2$-$C_{10}$, more preferentially $C_2$-$C_6$, and even more preferentially $C_2$-$C_5$ ester groups, preferably alkyl ester groups, which are preferably linear, amide groups and groups derived from styrene.

Preferably, Y is a moiety comprising a group that can be cleaved by at least one of the treatments selected from the group comprising a UV treatment, a thermal treatment, a mechanical stimuli treatment, an enzyme treatment, and a chemical trigger treatment. The various treatments for separating the hydrophilic moiety from the epilamization agent can be applied individually, or simultaneously or in series, depending upon the nature of the cleavable group that has to be separated from the remainder of the compound containing the hydrophobic and oleophobic moieties, with the hydrophilic moiety. In a particularly preferred manner, Y is a moiety comprising a cleavable group chosen from the group comprising a UV-cleavable group, a thermally cleavable group, a group cleavable by mechanical stimuli, an enzyme cleavable group, and a group cleavable by a chemical trigger. Preferably, Y is a moiety comprising a cleavable group chosen from the group comprising a moiety derived from a nitrobenzyl ester, a Diels Alder adduct, a group which is cleavable for example by ultrasound, a group which is cleavable for example by an esterase and a moiety having a dithio function, as defined above in relation to the epilamization agent according to the invention. Depending upon the cleavable group, the separation of the hydrophilic moiety from the remainder of the compound bearing the hydrophobic and oleophobic moieties preferably occurs by breaking the covalent bond connecting the cleavable group to said compound bearing the hydrophobic and oleophobic moieties, such that all that remains in the compound bearing the hydrophobic and oleophobic moieties is the most neutral possible remainder with respect to epilamization properties, since the essential part of the cleavable group molecule leaves with the hydrophilic group.

The A or A' functional groups of interest are capable of forming bonds (hydrogen, ionic) with water molecules. They are selected to be highly polar and hydrophilic in order to solubilise in an aqueous solution, preferably water, the copolymer and its L moieties. The number and/or size of the A and A' moieties are selected to be capable of temporarily masking the hydrophobic effect of said L moieties.

The L functional groups of interest are responsible for the epilame effect and correspond to the epilame-effect hydrophobic and oleophobic moieties of the epilamization agent of the invention described above. They comprise at least one halogen atom, preferably a fluorine atom. Preferably, L is a carbon moiety, namely a $C_2$-$C_{20}$, preferably $C_4$-$C_{10}$, and more preferentially $C_6$-$C_9$ alkyl chain, which may be cyclic, preferably with no heteroatom. L is partially or completely halogenated. Advantageously, L is an at least partially fluorinated and preferably completely fluorinated moiety. L may also comprise a hydrogen atom in the end group. L is preferably a perfluorinated alkyl chain.

The Q functional groups of interest of the P units are used to modify the properties of the copolymer or of the epilamization agent and/or to provide other functions. Advantageously, the copolymer comprises at least two different Q groups.

For example, the Q functional groups of interest are capable of reaction with the substrate surface to be coated with epilame, so as to form anchoring moieties for the epilame agent at the substrate surface. Advantageously, Q moieties cans also be provided as a terminal of the copolymer. For example, Q, which may be identical or different, forms an anchoring moiety, and is chosen from the group comprising thiols, thioethers, thioesters, sulphides, thioamides, silanols, alkoxysilanes, silane halides, hydroxyls, phosphates, protected or non-protected phosphonic acids, protected or non-protected phosphonates, amines, ammoniums, nitrogenated heterocycles, carboxylic acids, anhydrides, catechols (substituted or unsubstituted catechols, as catechol or nitrocatechol group).

In another possible embodiment, Q may be an alkyl chain, preferably a $C_8$-$C_{20}$ alkyl chain, used to modify the angle of contact obtained or a chain capable of forming cross-linking points in a complementary cross-linking step (step h). For example, the P units may be derived from stearyl methacrylate.

Preferably, the copolymer of the invention comprises, in mole percent, between 50% and 99%, preferably between 60% and 95% of N units, between 0% and 50%, preferably between 0% and 20%, and more preferentially between 0% and 10% of P units, and when M units or G units are present, between 1% and 50%, preferably between 5% and 40%, and more preferentially between 5% and 30% of M or G units, the percentages being expressed with respect to the total number of units (w+x+y) or (w+x+z).

Advantageously, the copolymer comprises between 10 and 350 units (w+x+y) or (w+x+z).

The composition of N and P units is similar to the above compositions when the hydrophilic block is the A' moiety according to formula III.

In a particularly advantageous manner, the M, N and P units are chosen to bear several A moieties, preferably of the same type, several L moieties, preferably of the same type, and possibly one or more Q moieties, which may be identical or of a different type, so as to refine and improve the properties of the epilame agent, in order to obtain more specifically a universal epilame agent exhibiting improved affinity with the substrate.

A statistical copolymer according to the present invention of form (I) is for example a copolymer that has the following structure (Ia):

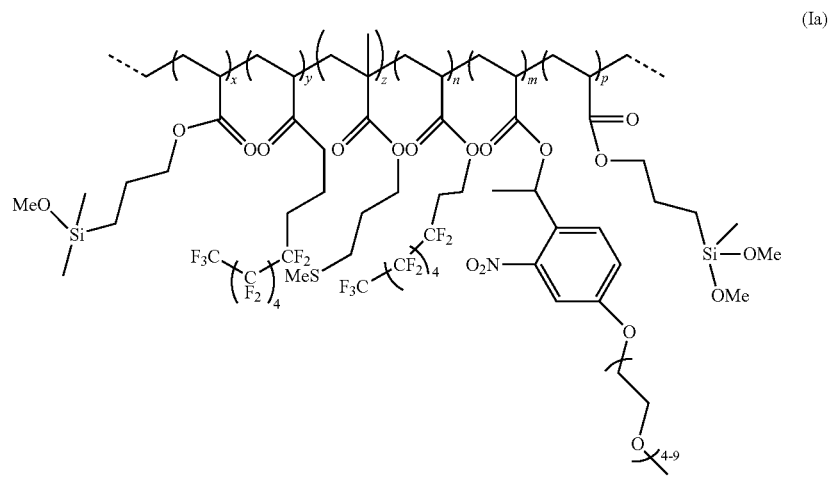

(Ia)

wherein the P units are anchoring units, the hydrophilic groups are derived from a PEG and the cleavable group is a moiety

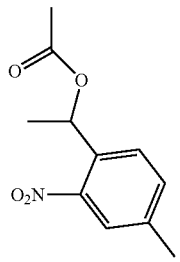 [SMILES: CC(=O)OC(C)c1ccc(C)cc1[N+](=O)[O-]]

derived from a UV-cleavable nitrobenzyl ester which, after cleavage, will give a —COOH remainder in the form of a side chain of the copolymer.

A block copolymer according to the present invention of form (II) is for example a block copolymer that has the following structure (IIa):

a hydrophilic A block wherein the hydrophilic groups are statistically distributed, said hydrophilic groups being derived from a PEG and the cleavable groups being moieties

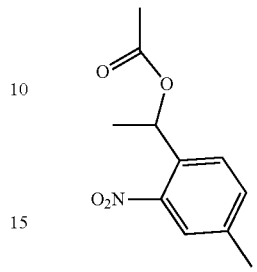

derived from a UV-cleavable nitrobenzyl ester which, after cleavage, will give —COOH remainders in the form of side chains of the A block copolymer. Such a copolymer is obtained, for example, by RAFT (reversible addition-fragmentation chain transfer polymerization). In this particular case, the number of units in the A block will not exceed 10, to limit the hydrophilia of the epilame after cleavage of the nitrobenzyl ester function (pendant COOH moiety).

In another embodiment which is not represented, the P units are anchoring units and form a third anchoring block, connected by covalent bonds to the epilame block.

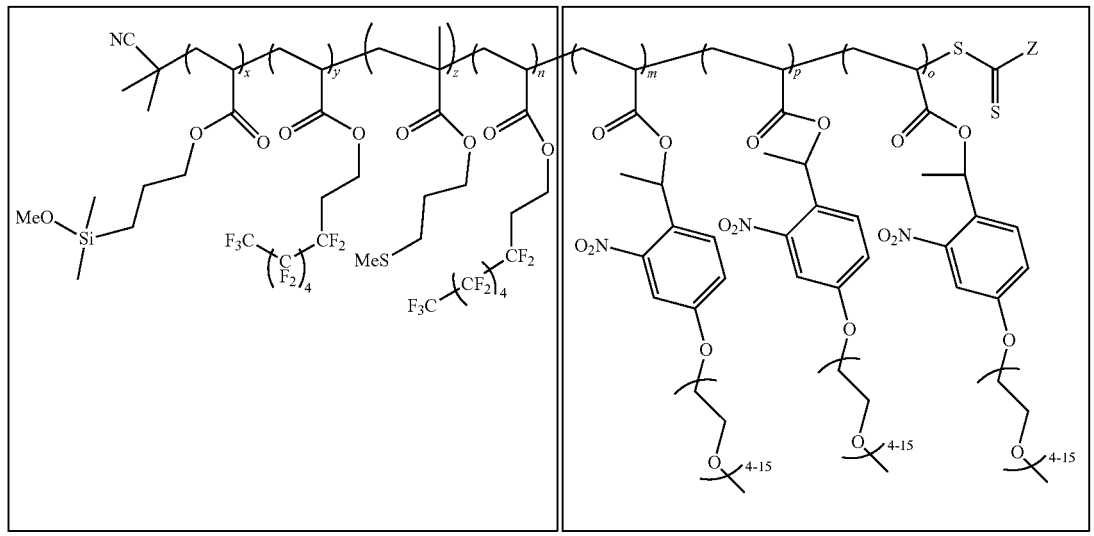

(IIa)

wherein the N and P units form an epilame-effect B block (the P units being anchoring units), wherein the P units are statistically distributed in the B block, and the M units form A block copolymer according to the present invention of form (III) is for example a block copolymer that has the following structure (IIIa):

(IIIa)

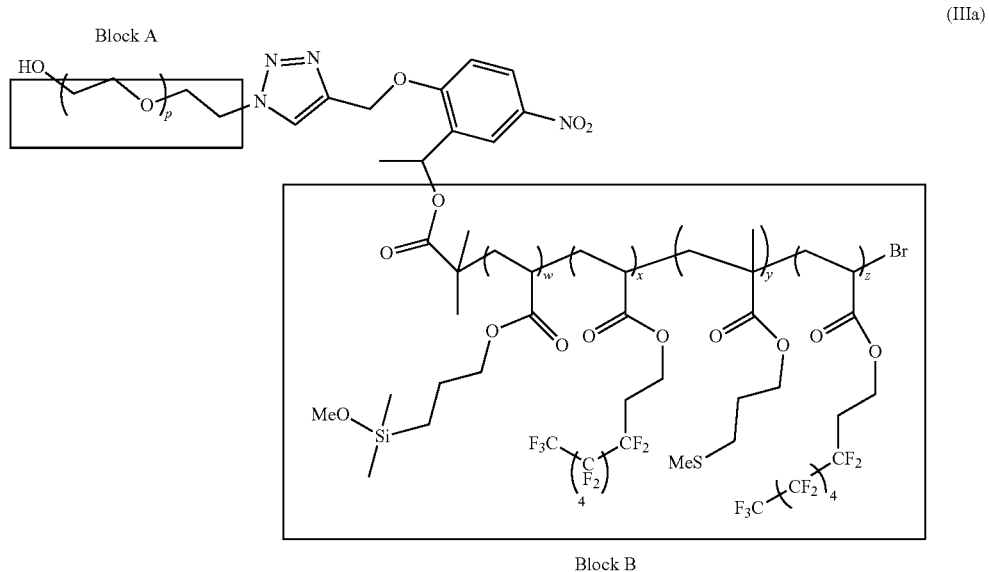

wherein the N and P units form an epilame-effect B block (the P units being anchoring units), wherein the P units are statistically distributed in the B block, and the hydrophilic A block is a hydrophilic A' moiety derived from a PEG, the A and B blocks being linked by a cleavable group

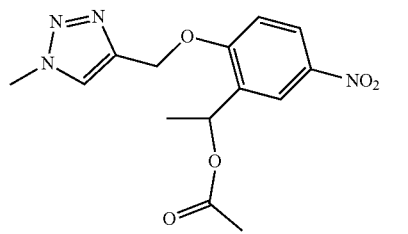 [SMILES: CC(=O)OC(C)c1cc([N+](=O)[O-])ccc1OCc1cn(C)nn1]

derived from a UV-cleavable nitrobenzyl ester which, after cleavage, will give a —COOH remainder at the end of the main copolymer chain of block B. Such a copolymer is obtained, for example by ATRP (atom-transfer radical-polymerization) from a PEG-functionalized o-nitrobenzyl bromoisobutyrate macroinitiator, which can be obtained by click chemistry.

A block copolymer according to the present invention of form (IV) is for example a block copolymer that has the following structure (IVa):

(IVa)

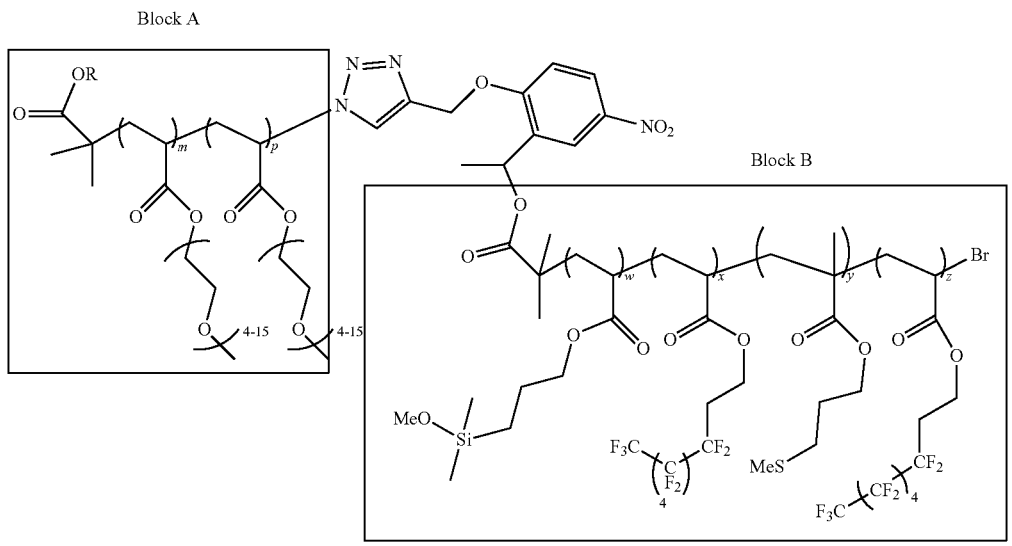

wherein the N and P units form an epilame-effect B block (the P units being anchoring units as will be seen below), wherein the P units are statistically distributed in the B block, and the G units form a hydrophilic A block wherein the hydrophilic groups are statistically distributed, said hydrophilic groups being derived from a PEG, the A and B blocks being linked by a cleavable group

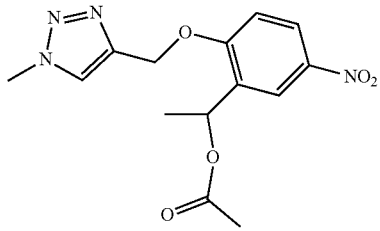 [SMILES: CC(=O)OC(C)c1cc([N+](=O)[O-])ccc1OCc1cn(C)nn1]

derived from a UV-cleavable nitrobenzyl ester which, after cleavage, will give a —COOH remainder at the end of the main copolymer chain of block B. Such a copolymer is obtained, for example by an ATRP/post-polymerization functionalization/ATRP series from a macroinitiator.

The present invention also concerns an epilamization bath containing at least 50% by volume of water, preferably at least 75%, and more preferentially 100% by volume of water, and an epilamization agent as described above, or comprising a copolymer as described above, solubilised in said bath.

The invention also concerns a method for coating with epilame at least one part of a substrate surface comprising the steps of:
  a) preparing an epilamization bath by solubilising at least one epilamization agent as defined above or containing at least one copolymer as defined above in a solution containing at least 50% by volume of water, preferably at least 75% by volume of water, and more preferentially 100% by volume of water
  b) optionally, preparing the substrate surface, particularly by cleaning in accordance with standard watchmakers' methods
  c) placing the substrate surface in contact with the epilamization agent in the epilamization bath
  d) optionally, drying
  e) separating the hydrophilic moiety from the epilamization agent by cleaving the cleavable group, for example in at least one individual, series or simultaneous cleavage treatment as described below
  f) rinsing the substrate surface
  g) drying.
  It is evident that step a) can be implemented remote in time from the other steps.

Advantageously, step e) is performed by UV illumination, thermal activation, mechanical stimuli (ultrasound), enzyme treatment, chemical trigger treatment, according to the cleavage technique corresponding to the cleavable group used, or any other technique compatible with the epilamization agent and the surface treated.

Advantageously, steps e) and f) are repeated until the hydrophilic residues are eliminated from the hydrophilic moiety, i.e. the hydrophilic portion cut off. For example, step e) can be repeated several times with different cleavage treatments, in series or simultaneously. Steps e) and f) can be repeated up to 5 times to wash and completely remove hydrophilic residues.

Preferably, step f) is performed in a solution containing at least 50% water, preferably at least 75% water, more preferentially 100% water.

Preferably, depending on the form of the copolymer used, the epilamization agent is prepared by the statistical or block copolymerisation of monomers capable of forming M units with monomers capable of forming N units and optionally with monomers capable of forming at least one P unit.

Statistical copolymerization techniques are well known to those skilled in the art and do not require detailed description. A particularly suitable polymerization mode for statistical copolymerization is free-radical copolymerization, in solution or in emulsion.

According to a first embodiment, the statistical copolymerisation of form (I) can be obtained in a single step by copolymerisation, preferably radical-copolymerisation, of monomers bearing the Y-A side chains of monomers bearing the X-L side chains and possibly monomers bearing the W-Q side chains.

According to another embodiment, the statistical copolymer of form (I) can be obtained by copolymerisation, preferably radical polymerisation, of monomers bearing the appropriate Y side chains with monomers bearing the appropriate X side chains and possibly with monomers bearing side chains intended to bear Q, the side chains are then modified after polymerization (post-functionalization), for example by 'click chemistry', to introduce the A, L functional groups of interest, and the Q groups.

A particularly suitable polymerization mode for block copolymerization is the controlled successive copolymerization of:
  monomers capable of forming at least one block of M units
  monomers capable of forming at least one block of N units and optionally with monomers capable of forming at least one P unit.

Two particularly suitable polymerisation modes for block copolymerization are atom-transfer radical-polymerization (ATRP) and reversible addition-fragmentation chain-transfer polymerisation (RAFT), in solution or emulsion.

For the copolymer of form (II) according to a first embodiment, the block copolymer may be obtained by polymerisation, preferably controlled radical polymerisation, of monomers bearing the Y-A side chains followed by copolymerisation, preferably controlled radical polymerisation, of monomers bearing the X-L side chains possibly with monomers bearing the W-Q side chains.

According to another embodiment, the block copolymer of form (II) may be obtained by polymerisation, preferably controlled radical polymerisation, of monomers bearing the appropriate Y side chains, followed by copolymerisation, preferably controlled radical polymerisation, of monomers bearing the appropriate X side chains, possibly with monomers bearing side chains intended to bear Q, the side chains are then modified, for example by 'click chemistry', to introduce the A, L functional groups of interest, and the Q groups.

For copolymers of form (III), the A' moiety is first functionalized with a derivative of cleavable group Y, then this new adduct is used as macroinitiator to polymerize the block containing the N units and optionally the P units by ATRP controlled radical polymerisation. The derivative of cleavable group Y will have a double function: it will comprise both a function allowing attachment to the A' moiety and on the other hand, a moiety that can initiate polymerisation of the block comprising the P and N units.

Click chemistry could advantageously be used to introduce the derivative of cleavable group Y into moiety A'.

For copolymers of form (IV), the block comprising G units is formed by ATRP controlled radical polymerisation using an initiator having a functional group. This functional group serves secondly to introduce cleavable group Y at the end of the block comprising G units. As described above, this polymer then serves as macroinitiator for polymerisation of the block comprising P and N units.

Preferably, the monomers are chosen from the group comprising acrylate, methacrylate, acrylamide, methacrylamide, vinyl, diene, styrene and olefinic monomers. Acrylate, methacrylate, acrylamide, methacrylamide, vinyl and styrene monomers are particularly preferred.

These products are known and available on the market or can be accessed in a few synthesis steps.

The monomers particularly preferred for forming the M units are:

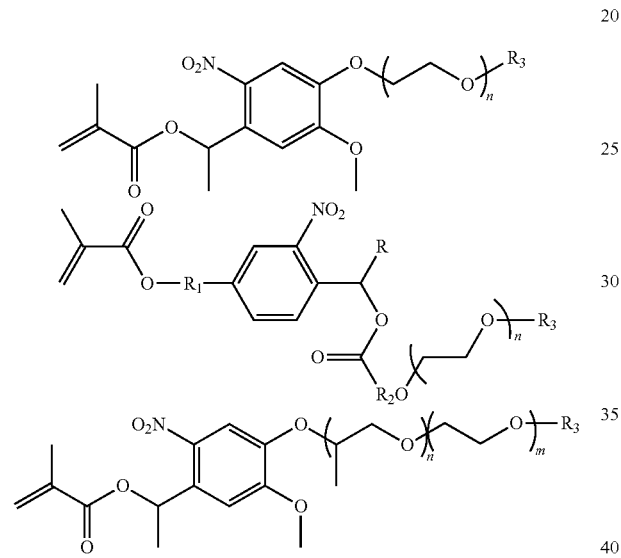

The monomers particularly preferred for forming the G units are:

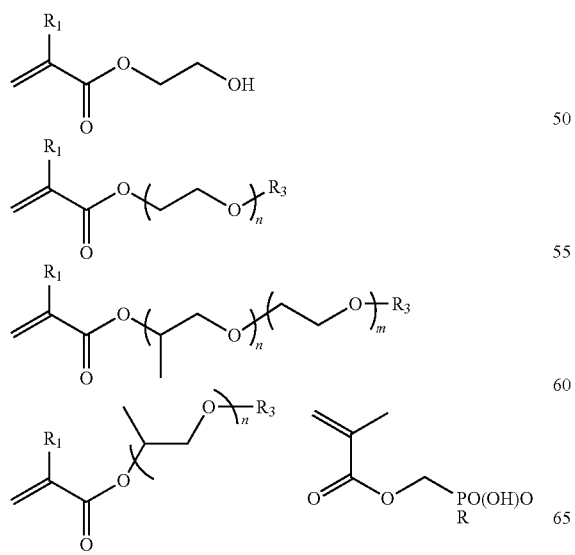

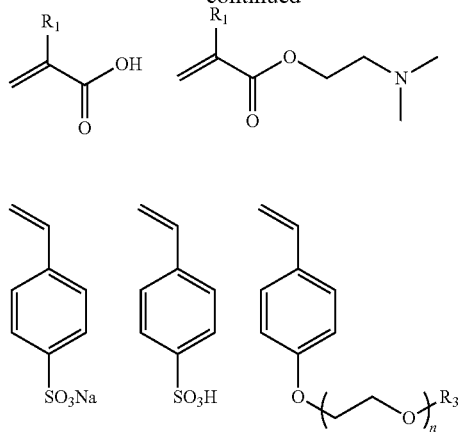

The monomers particularly preferred for forming the N and P units are:

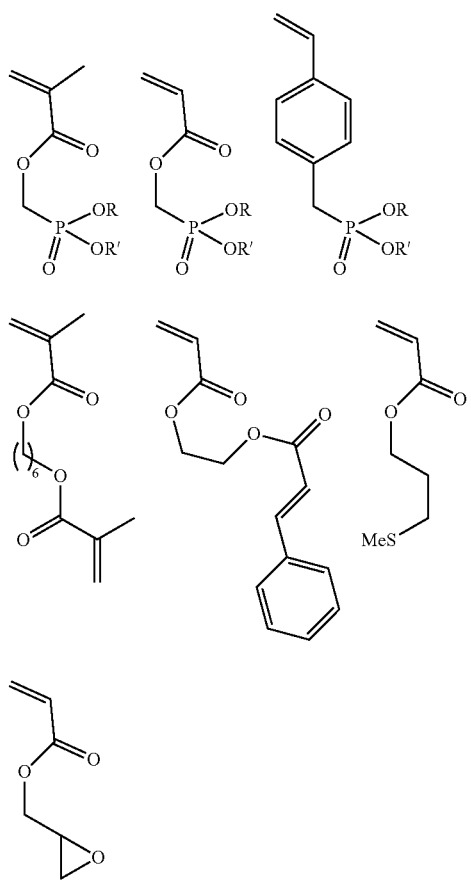

R is equal to or different from R'═H, alkyl, Si(Me)₃

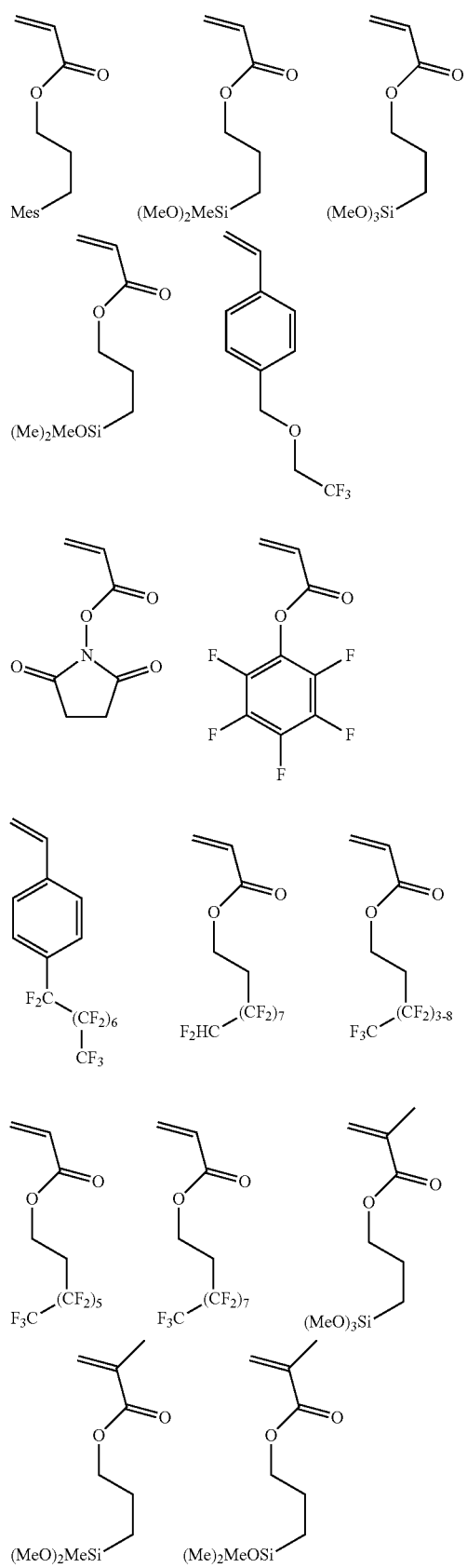

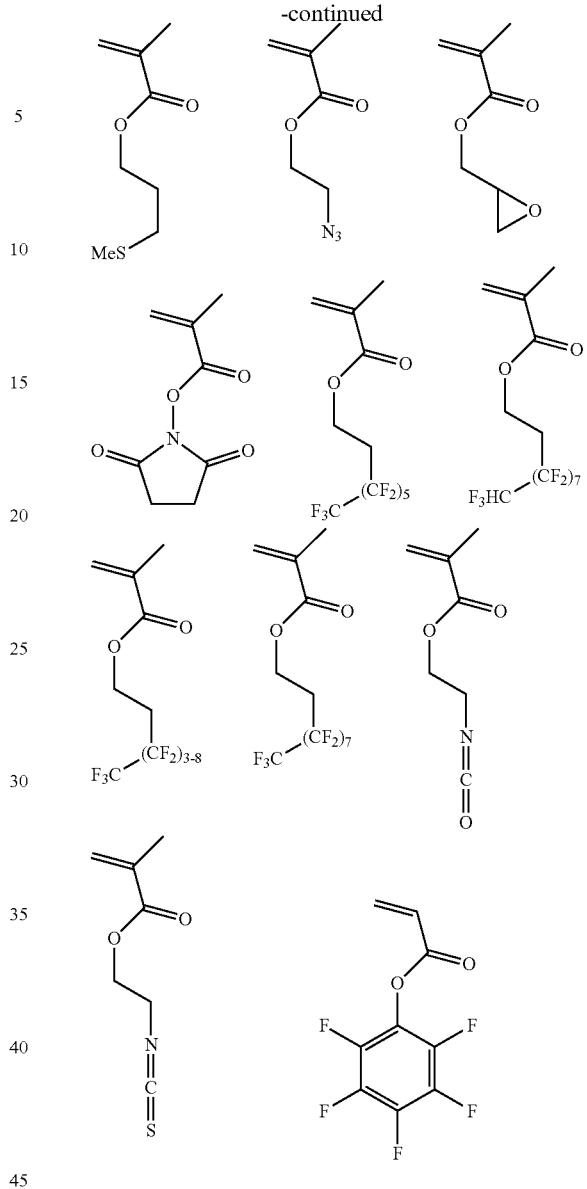

Advantageously, the copolymers of the invention can easily be obtained in a limited number of steps from commercially available products.

The copolymers used in the invention can be obtained in powder or viscous liquid form. They can then be placed in solution in an aqueous solvent, in concentrations preferably comprised between 50 mg/L and 900 mg/L, to obtain an epilamization agent solution containing at least 50% water, preferably 75% water, and more preferentially entirely aqueous, which will be used for treatment of the surfaces to be epilame coated.

According to the embodiments, the epilamization method according to the invention further comprises, after step g), a complementary cross-linking step h), made possible, in particular, by the presence of the appropriate functional groups of interest provided in the Q side chains of the P units.

The present invention also concerns a substrate having a surface at least part of which is coated with an epilame, wherein said epilame was obtained by cleaving an epilamization agent as defined above or containing at least one copolymer as defined above, said epilame containing at least one compound containing at least hydrophobic and oleophobic moieties and at least one remainder of a cleavable group which was used to link at least one hydrophilic moiety to said compound.

More particularly, when the epilamization agent comprises at least one copolymer as described above, the epilame comprises at least one compound in the form of a copolymer comprising N units, and optionally at least one P unit, linked by covalent bonds by their main chains, and at least one remainder of a cleavable group, wherein N and P are as defined above. Depending upon the form of the copolymer used in the epilamization agent, the remainder of the cleavable group is at the end of the main chain of the copolymer or at the end of a side chain of the copolymer, said copolymer then comprising only epilame-effect hydrophobic and oleophobic moieties.

Depending upon the cleavable group used, the remainder of the cleavable group is, for example, —COOH, —SH,

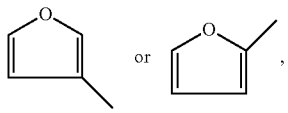

or another appropriate remainder, at the end of the main chain of the copolymer or at the end of a side chain of the copolymer, said copolymer then comprising only or overwhelmingly epilame-effect hydrophobic and oleophobic moieties.

Preferably, the substrate surface, at least part of which is coated with the epilame agent, is made of a material chosen from the group comprising metals, doped or undoped metal oxides, polymers, diamond, sapphire, quartz, ruby, silicon, silicon oxides, metal nitrides, particularly titanium nitrides, silicon nitrides, metal carbides, particularly tungsten carbides, metal borides, particularly tantalum borides, silicon carbides, DLC (Diamond Like Carbon), and their alloys.

More specifically, the substrate surface may be made of steel, or noble metals such as gold, silver, rhodium, palladium, platinum, or doped or undoped metal oxides of aluminium, zirconium, titanium, chromium, manganese, magnesium, iron, nickel, copper, zinc, molybdenum, silver, tungsten, or of polyoxymethylene or acrylamide, and their alloys.

The substrate according to the invention has a surface coated with an epilame that is simple and economical to synthesize, exhibiting affinity with any substrate type and improved resistance to cleaning compared to known epilames. An element or a piece with a substrate according to the invention may be used in any type of application in the field of mechanics, and more particularly in precision mechanics, and particularly in horology and jewellery.

Further, by using the epilamization agent or a copolymer according to the invention, the method according to the invention is ecological, since said epilamization agent or said copolymer is soluble in an aqueous epilamization bath.

What is claimed is:

1. An epilamization agent, comprising:
at least one compound comprising at least hydrophobic and oleophobic moieties arranged to impart epilame properties to said compound, and at least one hydrophilic moiety arranged to make said compound soluble in aqueous medium,
wherein all of said hydrophilic moiety is linked to the compound by at least one cleavable group.

2. The epilamization agent according to claim 1, wherein the hydrophobic and oleophobic moieties, which may be identical or different, contain a halogenated $C_1$-$C_{20}$ carbon moiety.

3. The epilamization agent according to claim 2, wherein the hydrophobic and oleophobic moieties, which may be identical or different, contain a fluorinated $C_1$-$C_{20}$ carbon moiety.

4. The epilamization agent according to claim 1, wherein the hydrophilic moiety is chosen from the group consisting of a moiety derived from a glycol ether, a moiety derived from an amine, a moiety derived from an alcohol, from a carboxylic acid, from a sulfonic acid, from a phosphonic acid, from a carboxylate salt, from a sulfonate salt, and from a phosphonate salt.

5. The epilamization agent according to claim 4, wherein the moiety derived from a glycol ether takes the form of a moiety derived from a polyether.

6. The epilamization agent according to claim 5, wherein the moiety derived from a polyether is a moiety derived from a polyethylene glycol.

7. The epilamization agent according to claim 5, wherein the moiety derived from a polyether is a moiety derived from a polypropylene glycol.

8. The epilamization agent according to claim 4, wherein the moiety derived from an amine takes the form of a moiety derived from a polyamine.

9. The epilamization agent according to claim 1, wherein the cleavable group is a group that can be cleaved by at least one of the treatments selected from the group consisting of a UV treatment, a thermal treatment, a mechanical stimuli treatment, an enzyme treatment, and a chemical trigger treatment.

10. The epilamization agent according to claim 9, wherein the at least one cleavable group is each chosen from the group consisting of a moiety derived from a nitrobenzyl ester, a Diels Alder adduct, and a moiety comprising a dithio function.

11. The epilamization agent according to claim 1, wherein the cleavable group with the associated hydrophilic moiety form a linear or branched structure with the compound.

12. The epilamization agent according to claim 1, wherein the hydrophobic and oleophobic moieties form a linear or branched structure with the compound.

13. The epilamization agent according to claim 1,
wherein the compound is a copolymer, and
when the epilamization agent is subjected to at least one cleavage treatment, the at least one cleavable group is cleaved to release all of said hydrophilic moiety, and the hydrophobic and oleophobic moieties are not removed from the compound.

14. The epilamization agent according to claim 1, wherein the compound is a copolymer.

15. An epilamization bath comprising at least 50% by volume of water and a solubilised epilamization agent as defined in claim 14.

16. An epilamization bath comprising at least 50% by volume of water and a solubilised epilamization agent as defined in claim 1.

* * * * *